(12) United States Patent
Yamrom (10) Patent No.: US 6,249,287 B1
(45) Date of Patent: Jun. 19, 2001

(54) METHOD OF MODELING A CLOSED SURFACE GEOMETRY

(75) Inventor: Boris Yamrom, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/192,349

(22) Filed: Nov. 16, 1998

(51) Int. Cl.[7] .................................................. G06T 15/00
(52) U.S. Cl. ........................ 345/419; 345/420; 345/425; 345/428
(58) Field of Search .................................. 345/419, 420, 345/423, 425, 428

(56) References Cited

U.S. PATENT DOCUMENTS

| 5,214,752 | * | 5/1993 | Meshkat et al. | 395/123 |
| 5,440,674 | * | 8/1995 | Park | 395/123 |
| 5,602,979 | * | 2/1997 | Loop | 395/119 |
| 5,798,764 | * | 8/1998 | Akiyama | 345/423 |
| 5,886,702 | * | 3/1999 | Migdal et al. | 345/423 |
| 6,046,744 | * | 4/2000 | Hoppe | 345/419 |

OTHER PUBLICATIONS

Lorenson et al. "Marching Cubes: High Resolution 3D Surface Construction Algorithm" Computer Graphics, vol. 21, No. 4, Jul. 1987, pp. 163–169.

Lutkenhoner et al. "Comparison between Different Methods to Approximate and Area of the Human Head by a Sphere" Auditory Evoked Magnetic Fields and Electric Potentials, 1990, pp. 103–118.

Schroeder et al. "Decimation of Triangle Meshes" Computer Graphics, 26, 2, Jul. 1992, pp. 65–70.

* cited by examiner

Primary Examiner—Mark Zimmerman
Assistant Examiner—Enrique L Santiago
(74) Attorney, Agent, or Firm—Jean K. Testa; Marvin Snyder (57) ABSTRACT

A method for modeling an object with a polygonal mesh includes obtaining a closed-surface polygonal mesh and positioning the closed-surface polygonal mesh relative to the object. A ray is projected through a point-of-interest on said closed-surface polygonal mesh. The existence of an intersection point between said ray and a surface of the object is determined and the location of the point-of-interest is adjusted in response to the existence and location of the intersection point. The projecting is repeated for a plurality of points in the closed-surface polygonal mesh in order to approximate the object.

24 Claims, 14 Drawing Sheets

FIG. 1
*(PRIOR ART)*

4310 TRIANGLES

512 TRIANGLES

512 TRIANGLES

880 TRIANGLES

FIG. 15

METHOD OF MODELING A CLOSED SURFACE GEOMETRY

BACKGROUND OF THE INVENTION

The invention relates to a method of modeling a closed surface geometry and in particular to a method of modeling a closed surface geometry using a mesh having a reduced number of polygons.

Many branches of biomedical science and engineering require geometric modeling of various parts of the human body. The success of magnetic resonance imaging (MRI) and other imaging modalities of computer aided tomography have lead to many achievements in scientific visualization of parts of the human body. Typical methods based on slice data generate models containing hundreds of thousands of triangles that provide excellent details for 3D visualizations, but cannot be used directly for scientific analysis with numerical methods due to their huge size and lack of smoothness.

There exist methods that substantially reduce (more than 90%) the number of triangles in the model, but these methods are still unsatisfactory for analytical purposes. These methods were designed specifically to preserve the topology of the original geometry produced from slice data and, therefore, are subject to possible noise influence that results in holes and other irregularities of geometry.

Conventional methods do not reduce the number of triangles to a desired level. To alleviate these problems, scientists use drastically simplified models for their analysis. These models may be either spheres or cylinders of appropriate size and position. A drawback to the use of known geometry (e.g. spheres, cylinders, etc.) is that the models do not approximate the surface to be modeled with sufficient accuracy. There is a perceived need in the art for models that satisfy the requirement of computational simplicity and at the same time approximate the parts of the body more accurately than known geometry such as spheres and cylinders.

BRIEF SUMMARY OF THE INVENTION

A method for modeling an object with a polygonal mesh includes obtaining a closed-surface polygonal mesh and positioning the closed-surface polygonal mesh relative to the object. A ray is projected through a point-of-interest on the closed-surface polygonal mesh. An intersection point between the ray and a surface of the object is determined and the location of the point-of-interest is adjusted in response to the location of the intersection point. The projecting is performed for a plurality of points in the closed-surface polygonal mesh in order to approximate the object.

BRIEF DESCRIPTION OF THE DRAWINGS

Referring now to the drawings wherein like elements are numbered alike in the several FIGURES.

DETAILED DESCRIPTION OF THE INVENTION

Figure 1:
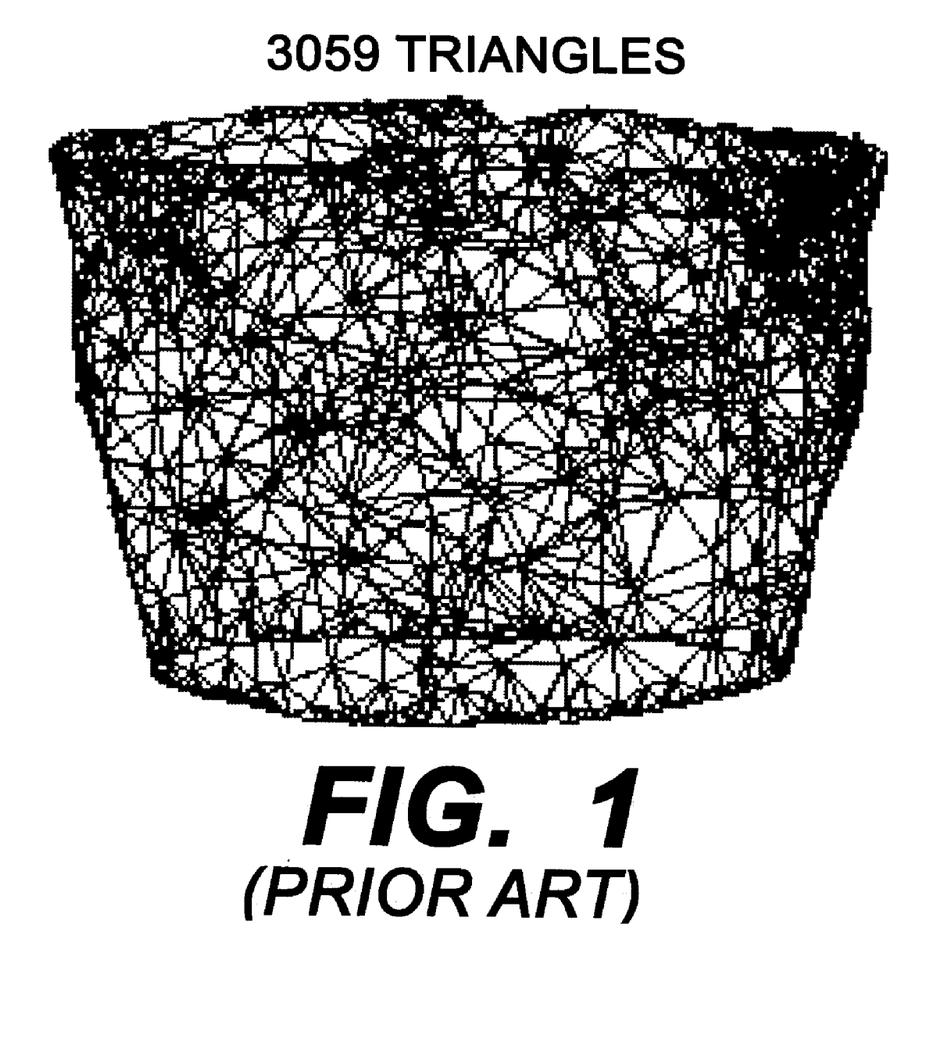
FIG. 1 is a triangular mesh model of a torso created in accordance with a prior art modeling method.
Figure 2:
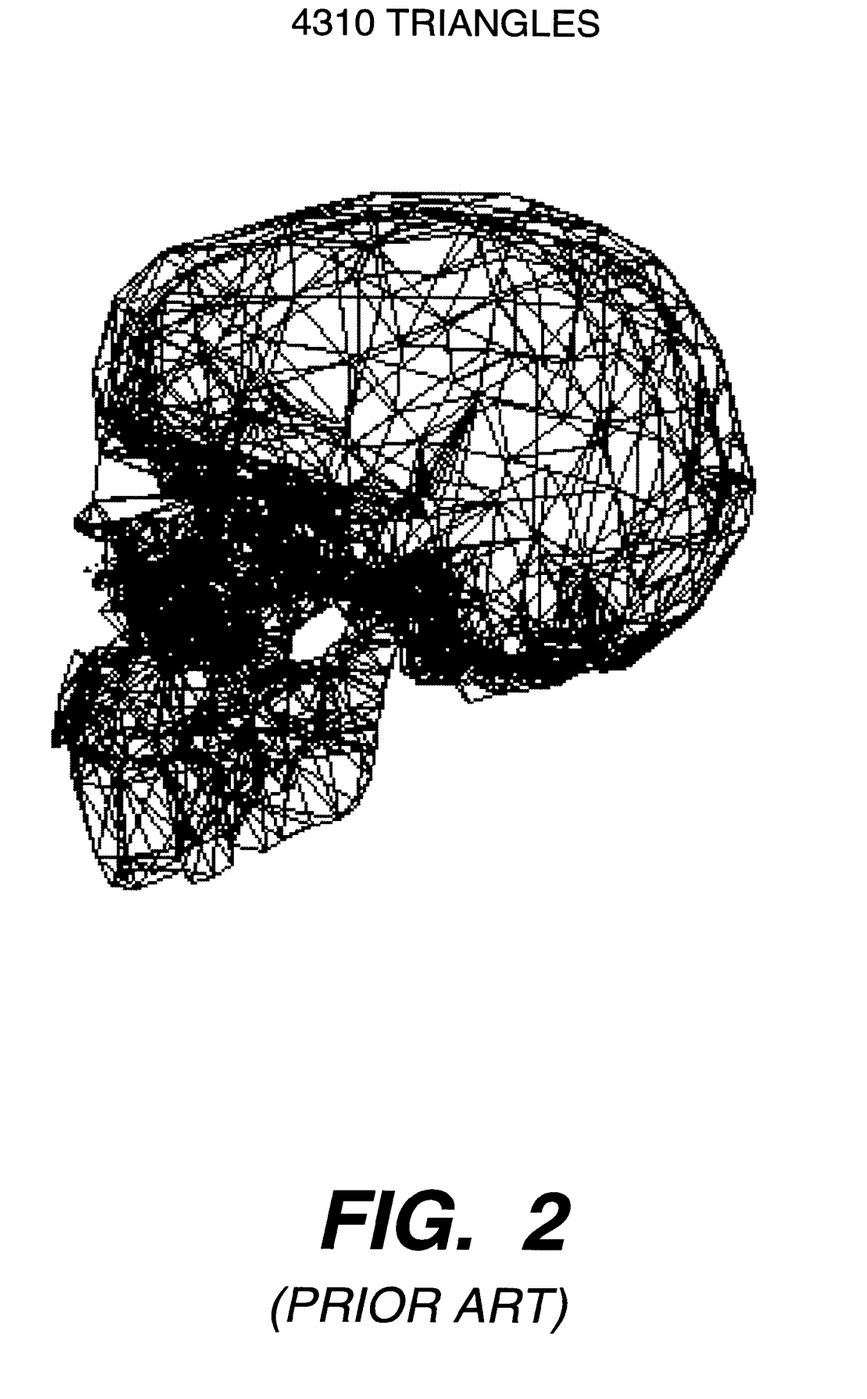
FIG. 2 is a triangular mesh model of a skull created in accordance with a prior art modeling method.

FIGS. 1 and 2 are conventional, triangular mesh models of a torso and a skull, respectively. Both of these models have already been decimated using conventional techniques to reduce the number of triangles. The torso shown in FIG. 1 includes 3059 triangles. The skull shown in FIG. 2 includes 4310 triangles. Although a decimation process has reduced the number of triangles, these prior art models still contain a large number of triangles rendering computational analysis difficult.

The present invention fits a reduced mesh to the surface of an object to approximate the object. If the object is a complex model, the reduced mesh has fewer polygons (e.g. triangles) than the complex model but still accurately represents the surface to be modeled and maintains a predetermined degree of smoothness. The invention uses a reduced mesh made up of a closed mesh with a relatively small number of polygons that is placed inside or outside of an unprocessed complex model containing many thousands of polygons. Points of the reduced mesh are then projected to a projected position to approximate the surface of the complex model. The resulting projection of the reduced mesh has fewer polygons than the complex model, is closed, and approximates the surface of the original, complex model. As described herein, any holes or irregularities in the original, complex model are sealed and smoothed by the process of projecting the closed, reduced mesh.

Figure 3:
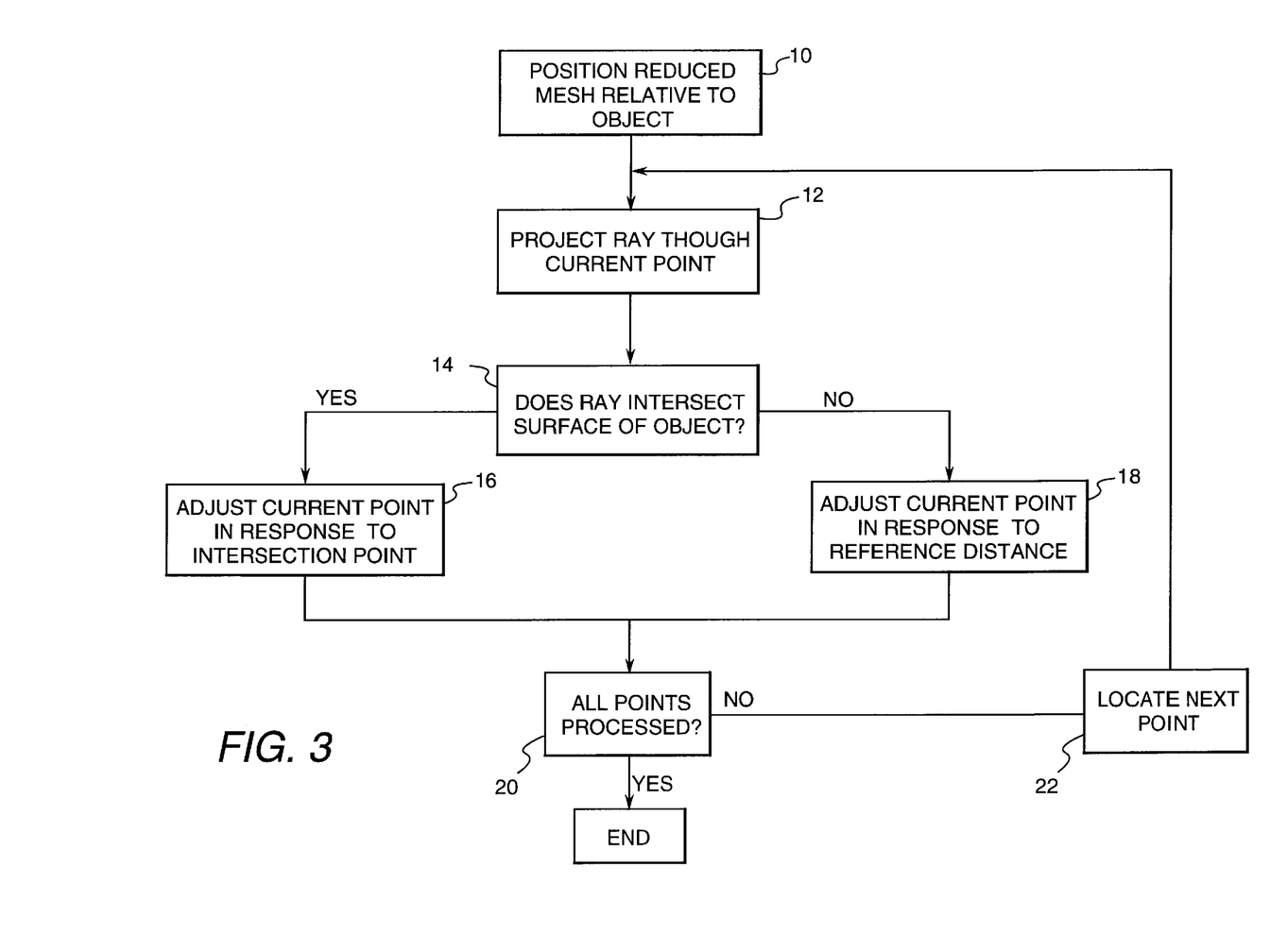
FIG. 3 is a flowchart of a general method of modeling a closed surface.
Figure 4:
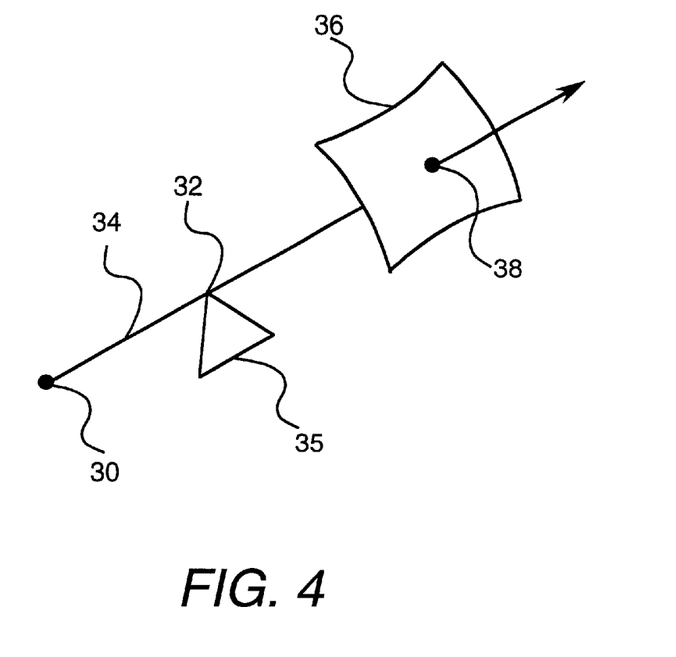
FIG. 4 illustrates projecting a point of a reduced mesh to a point on the surface of an object.
Figure 5:
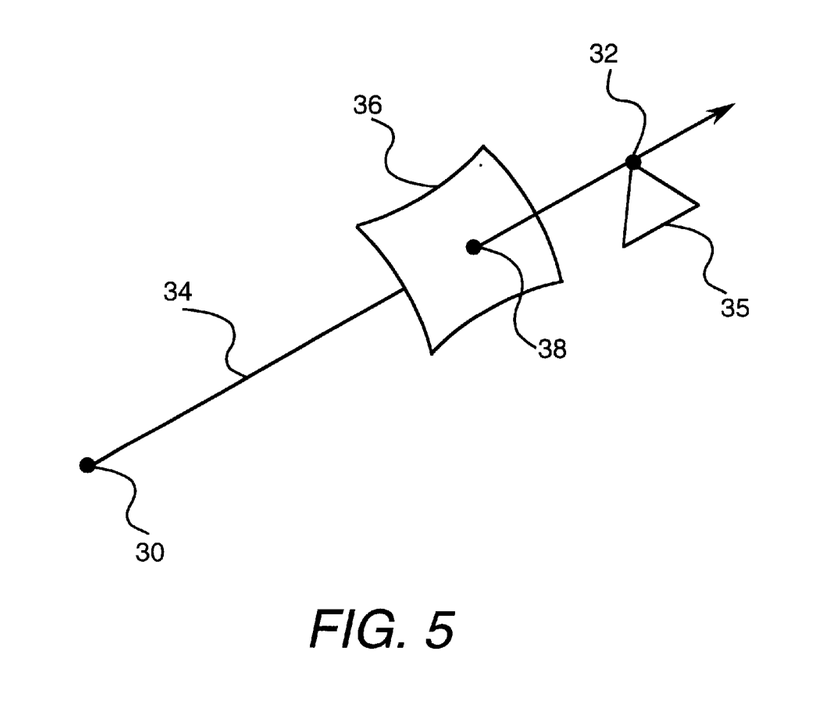
FIG. 5 illustrates projecting a point of a reduced mesh to a point on the surface of an object.

FIG. 3 is a flowchart of a general method of modeling a closed surface. At step 10, a reduced mesh having a predetermined number of polygons is positioned relative to the object to be represented by the reduced mesh. The reduced mesh may be positioned inside or outside the object. At step 12, a ray is projected through a point of the mesh (for example, a vertex of a polygon). FIG. 4 illustrates the process of projecting a ray through a point of the reduced mesh. A ray 34 is generated from a start point 30 through point-of-interest 32, which may correspond to a vertex of a polygon 35 in the reduced mesh. The reduced mesh is a closed surface and FIG. 4 only shows one polygon 35 for clarity. The intersection of the ray 34 and the surface 36 of the object defines an intersection point 38. Only a portion of surface 36 of the object is shown for clarity. FIG. 5 shows a similar projection in which the object is placed inside the reduced mesh. Due to holes in the object, the ray 34 may not intersect the surface 36. At step 14, it is determined whether ray 34 intersects surface 36. If so, flow proceeds to step 16 where the location of the intersection point 38 is used to determine a projected position of the reduced mesh point 32. In some instances, the projected position of point 32 will be the intersection point 38. The projected position can also be distanced from the surface 36 of the object and still provide a good approximation of the object. If at step 14, it is determined that the ray 34 does not intersect surface 36, then flow proceeds to step 18 where the projected position is determined based on a reference distance. Both steps 16 and 18 proceed to step 20 where the process ends if all points are processed. If not, step 22 locates the next point for processing.

Figure 6:
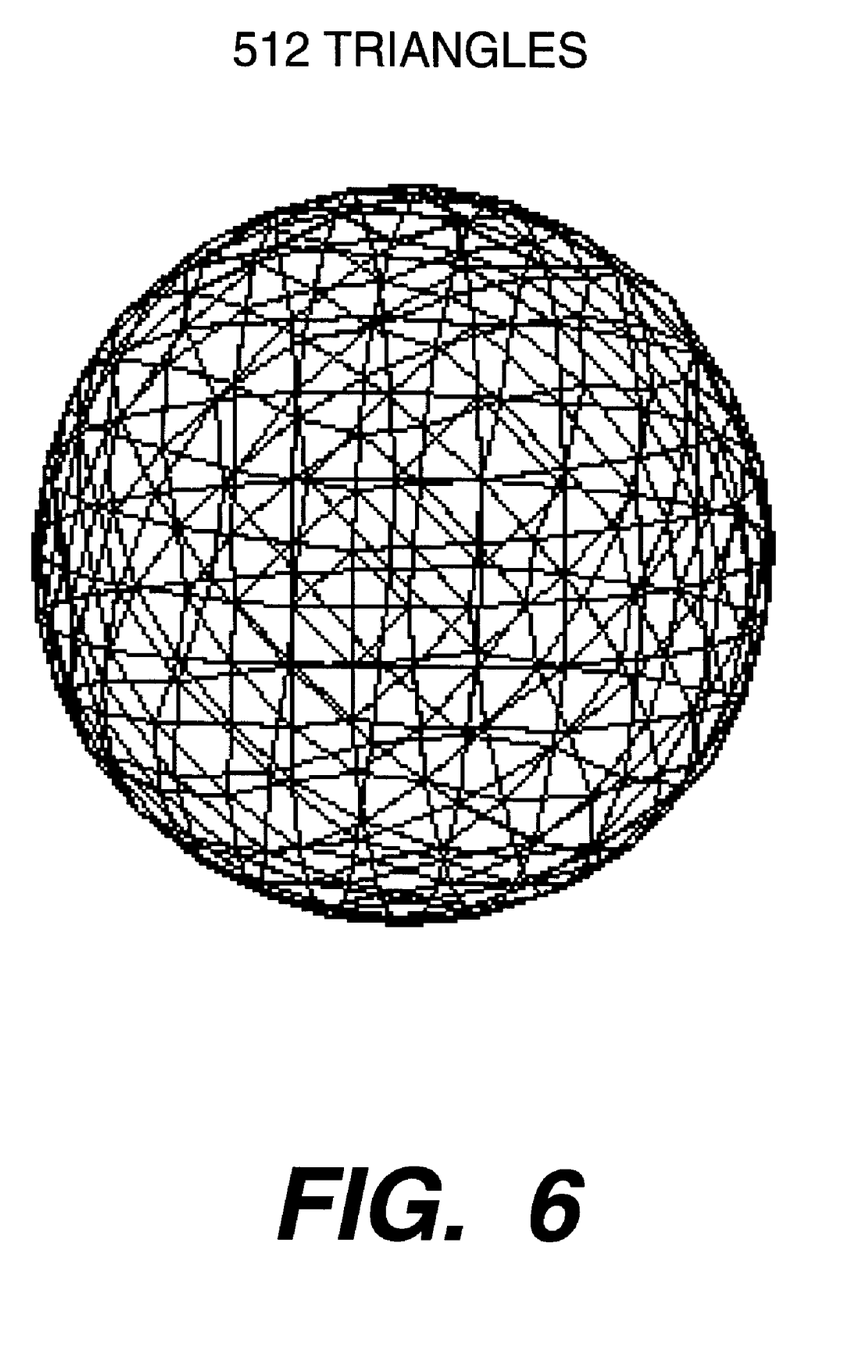
FIG. 6 illustrates a spherical, reduced mesh used in an exemplary embodiment of the invention.

Two exemplary embodiments of the invention will now be described. As described above, any geometry may be used for the reduced mesh. The shape of the reduced mesh is selected so as to provide a good correspondence with the complex model. In a first embodiment of the invention, the reduced mesh is a sphere polygonized by recursive subdivision of an octahedron as shown in FIG. 6. The spherical, reduced mesh is selected for modeling the brain of the skull shown in FIG. 2. The process for projecting the spherical, reduced mesh to the surface of an object is provided below. The spherical, reduced mesh is formed with triangles, but it is understood that other polygons may be used. In the algorithm, the following notations are used.

Points—an array of (x, y, z) coordinates corresponding to triangle mesh nodes.

Nodes—integers that are indices of Points in the array Points.

Elements—an array of triangles in the mesh.

d(P1, P2)—the Euclidean distance between three dimensional points P1 and P2.

MAX_NODE—the number of nodes in the mesh.

MAX_ELEMENT—the number of triangles in the mesh.

Center—the starting point for projected rays positioned inside the reduced mesh.

Surface—the raw data surface of the object to be approximated by the reduced mesh. This surface may contain holes and other topological irregularities.

Intersection—the distance from the Center along the projected ray. If due to a hole in the Surface there is no intersection, the value is zero.

tart_node—the value of a point index corresponding to a starting point for the recursive algorithm. If the ray through the starting point does not intersect the Surface, the algorithm loops through the points in the reduced mesh until a point in the mesh projects to the Surface.

Apoint—a temporary (x,y,z) variable.

Smoothness—a variable to control smoothness of the projected, reduced mesh. Smoothness should be greater than zero and less or equal to one.

E_visited—an array to store markings for each element in the array Elements. This array is initialized to zero and whenever a new element is processed, a corresponding entry in the array is set to one. Similar marking is performed for the Nodes array. These two arrays provide efficiency of calculation and serve for termination of the recursive algorithm.

Computational blocks that are used in the process are described below. These blocks can be implemented either as macros or procedures and the term "computations" is used to denote both possibilities and other alternatives.

GET_ELEMENT_EDGE_NEIGHBORS(elem,p1,p2, nei,no_nei)

Computation that takes an element elem from the array Elements, and two indices of Nodes p1 and p2 that belong to elem and produce the number of neighbors no_nei and an array of neighbor elements nei. In a triangular mesh embodiment, each triangle in the mesh has three neighbors, one for each edge.

SET_INTERSECTION(Points[i],intersection)

Computation that takes a point Points[i] and projects a ray from the Center through Points[i] onto the Surface of the object. The variable Intersection holds the distance from the Center to the intersection point. If there is no intersection, then Intersection is equal to zero.

GET_POINT(APoint)

Computation that stores the (x,y,z) coordinates of the intersection point into APoint.

GET_INTERSECTION(i,Points[i],t,d)

Computation that stores in d the distance from the Center to the intersection point. If an intersection does not exist or the distance d is such that the ratio of d to t is either less than the Smoothness or greater than 1/Smoothness, then d is set equal to t. This preserves smoothness of the projected, reduced mesh by not allowing distances from neighboring nodes to the Center to change drastically.

GET_NODE_ELEMENTS(i,elems,no_elements)

Computation that stores in elems the array of triangles that contain node i and store the number of these triangles into no_elements. Only the first element of the array elems is used.

GET_ELEMENT_NODES(elem,nd,no_nd)

Computation that stores in the array nd a list of node indices that belong to the triangle elem and store in no_nd the number of these indices.

The process for projecting the spherical, reduced mesh to approximate the surface of an object is presented below in C language.

---

SPHERICAL PROJECTION ALGORITHM

```
FOR_ALL_NODES(i) {
    SET_INTERSECTION(Points[i],intersection);
    if (intersection) {
        GET_POINT(APoint);
        intersection = d(Apoint,center);
        GET_NODE_ELEMENTS(i,elements,no_elements);
        break;
    }
}
    process_element(elements[0],intersection);
/*
* Process_element is a recursive procedure. Its termination is guaranteed
* by marking the processed elements
*/
process_element(int elem, float t)
{
    int *nd,no_nd;
    int p1,p2,p3;
    int nei[MAX_NEIGHBORS],no_nei;
    float d1=0.0,d2=0.0,d3=0.0;
    E_visited[elem]=TRUE;
    GET_ELEMENT_NODES(elem,nd,no_nd);
    p1=nd[0];
    p2=nd[1];
    p3=nd[2];
    GET_INTERSECTION(p1,Points[p1],t,d1);
    GET_INTERSECTION(p2,Points[p2],t,d2);
    GET_INTERSECTION(p3,Points[p3],t,d3);
/*
* For each edge of the triangle get its neighbor and if it is not visited,
* then visit it
*/
GET_ELEMENT_EDGE_NEIGHBORS(elem,p1,p2,nei,no_nei);
if (!E_visited[nei[0]])
    process_element(nei[0],(d1+d2)/2);
```

SPHERICAL PROJECTION ALGORITHM

```
GET_ELEMENT_EDGE_NEIGHBORS(elem,p1,p3,nei,no_nei);
if (!E_visited[nei[0]])
    process_element(nei[0],(d1+d3)/2);
GET_ELEMENT_EDGE_NEIGHBORS(elem,p2,p3,nei,no_nei);
if (!E_visited[nei [0]])
    process_element(nei[0],(d2+d3)/2);
}
```

Figure 7:
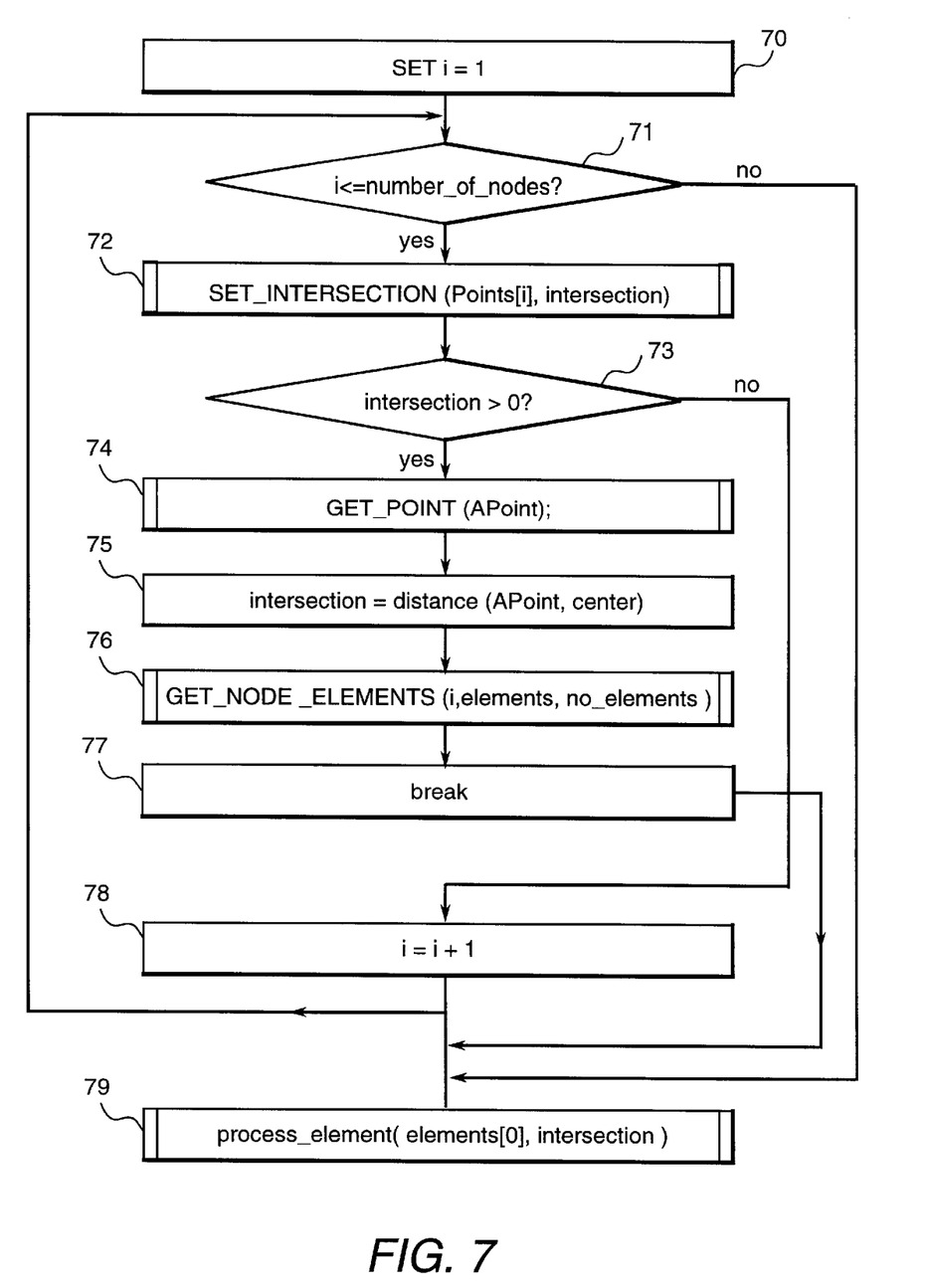
FIG. 7 is a flowchart of the process of projecting the spherical, reduced mesh of FIG. 6.

FIG. 7 is a flowchart depicting the spherical projection process. At step 70, variable i is set to 1 and processing is performed for each mesh point as indicated by step 71. At step 72, a ray is projected from the Center through a point of the reduced mesh. The point currently processed is referred to as the point-of-interest. The intersection of the ray and the surface of the object defines an intersection point. If there is no intersection, determined at step 73, then i is incremented at step 78 and the process continues processing points until an intersection point is located.

If there is an intersection, step 74 stores the intersection point coordinates. At step 75, the distance from the starting point (e.g. the Center) to the intersection point is computed and stored. At step 76, the process stores the array of elements (for example, triangles) that contain the point-of-interest. Once an initial intersection point has been located, step 77 breaks the process of locating the initial intersection point and flow proceeds to step 79 which implements a process_element routine. The process_element routine recursively visits each element (beginning with the element containing the initial intersection point) and determines the projected position for each point in the spherical, reduced mesh.

Figure 8:
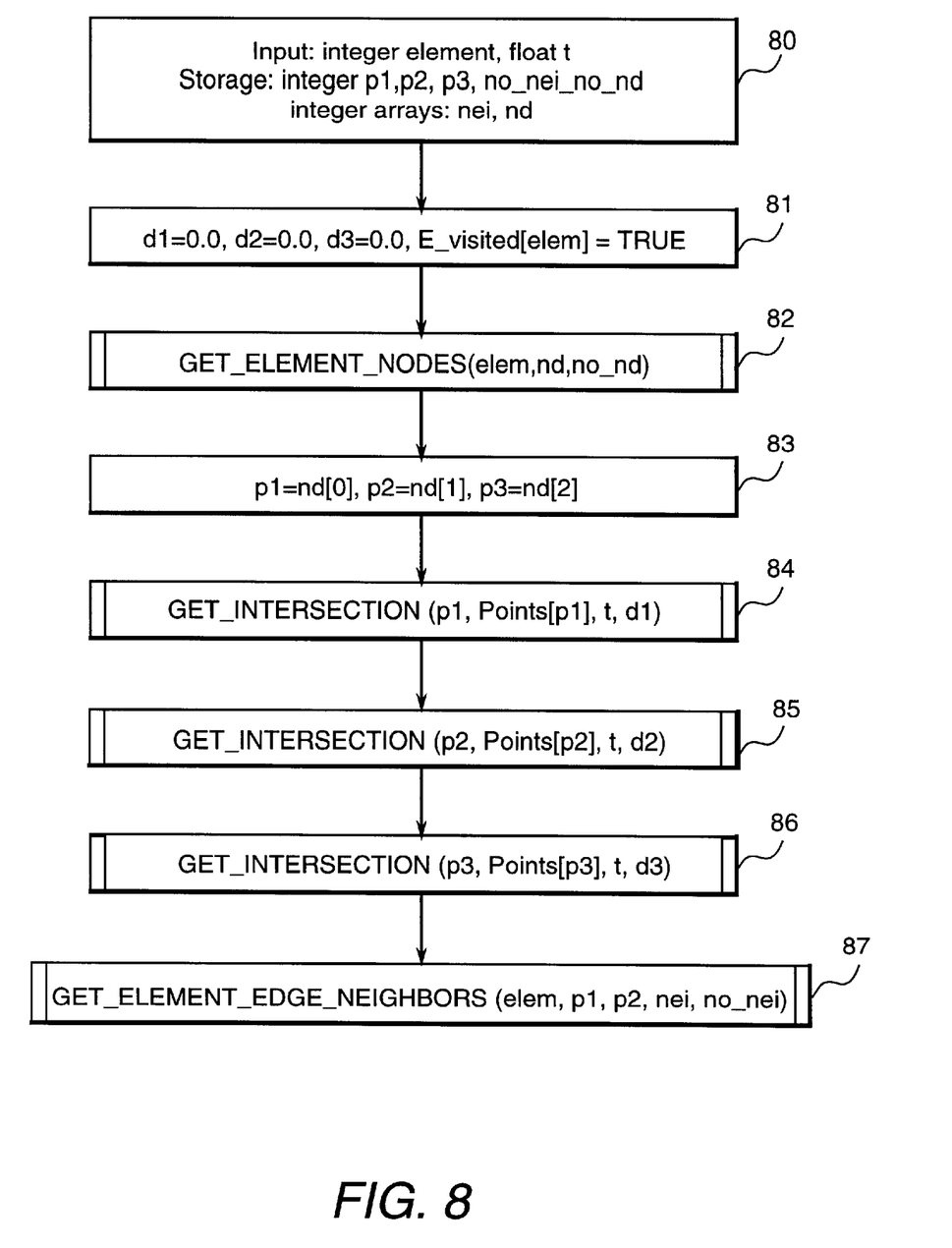
FIGS. 8 and 9 are a flowchart of a routine used in the process shown in FIG. 7.
Figure 9:
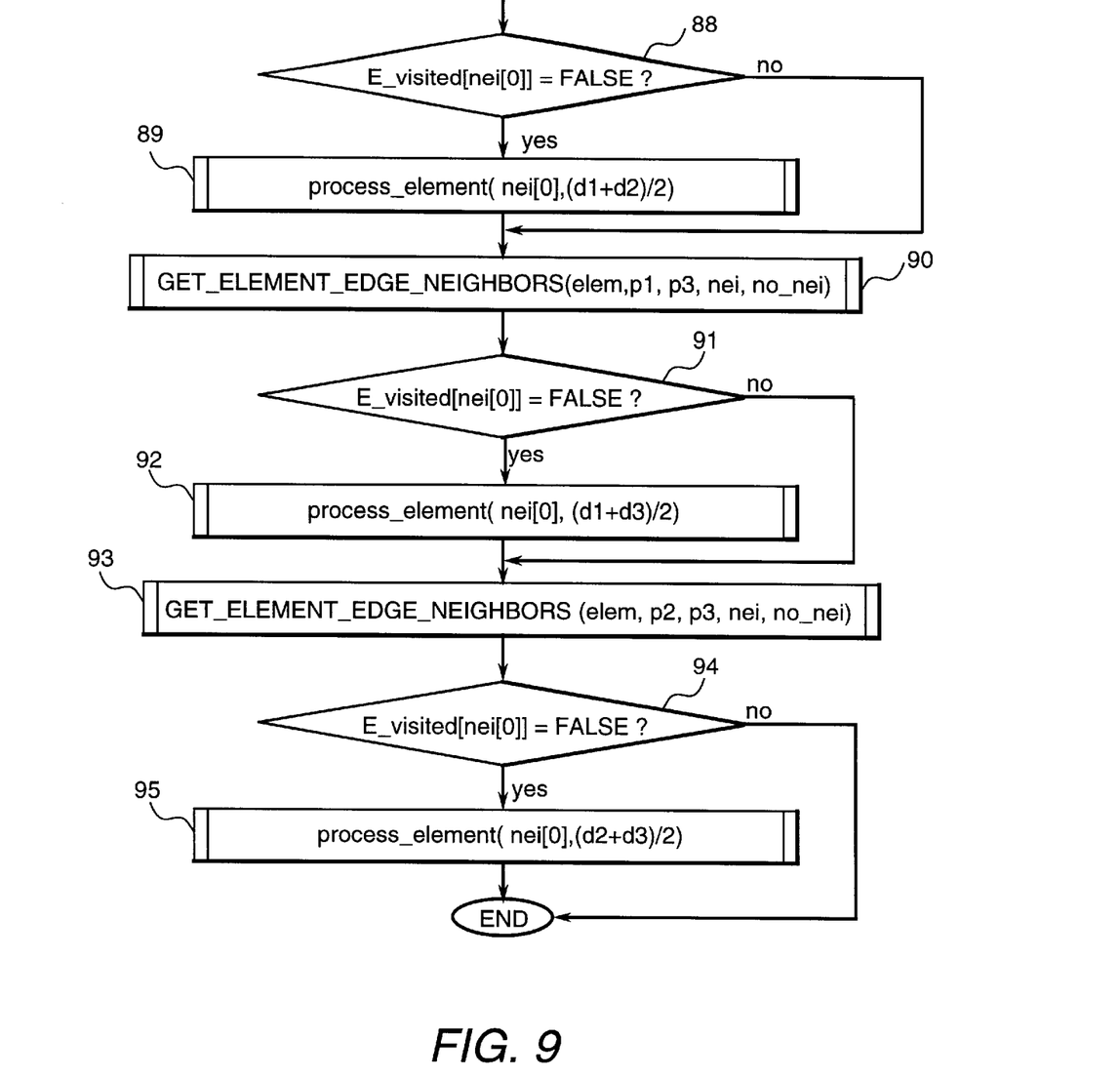

FIGS. 8 and 9 are a flowchart of the process_element routine. The routine views each element of the mesh (for example, each triangle in a triangular mesh) and determines the appropriate projected position for each node (e.g. vertex) in each element. Steps 80 and 81 initialize values to be used in the process_element routine. At step 82, a list of node indices belonging to the current element is stored. In an exemplary embodiment where each element is a triangle, the number of nodes is three indicated by nd[0], nd[1], and nd[2]. Step 83 sets variables p1, p2, and p3 to points in the array nd. For each point p1, p2 and p3, the routine get_intersection is performed through steps 84–86. As described above, get_intersection determines the distance from the starting point of a ray to an intersection point of the ray and the Surface. To preserve smoothness of the projected, reduced mesh, an average distance of a plurality of neighboring projected points (e.g. (d1+d2)/2) is used to define a reference distance t. If the distance (d) from the Center to the intersection point for the point-of-interest is equal to 0 (no intersection), then d is set to t. The ratio of d to t is compared to a Smoothness limit ($\alpha$). If (d/t)>(1/$\alpha$) or (d/t)<$\alpha$, then d is set to t. The Smoothness variable $\alpha$ is user defined and may vary from greater than zero to one. The smoothness processing ensures that there is not a large variation from the position of one projected point to the next.

Steps 87–95 continue processing of points in the reduced mesh by locating unprocessed elements neighboring processed points and performing the process_element routine on the unprocessed elements. Step 87 locates the elements neighboring a processed element. If the reduced mesh is made up of triangles, each element is a triangle and has three neighbors, one for each edge. At step 88, it is determined if a neighboring element has been processed and if not, flow proceeds to step 89 where the process_element routine is performed for the unprocessed element. As shown in step 89, the variable t is set to the average distance of two projected points neighboring the point-of-interest to be processed. Steps 90–95 continue this processing until all the elements have been processed. In this way, all the elements of the mesh, and thus all the points in each element, are processed and the smoothness of the projected, reduced mesh is controlled.

Figure 10:
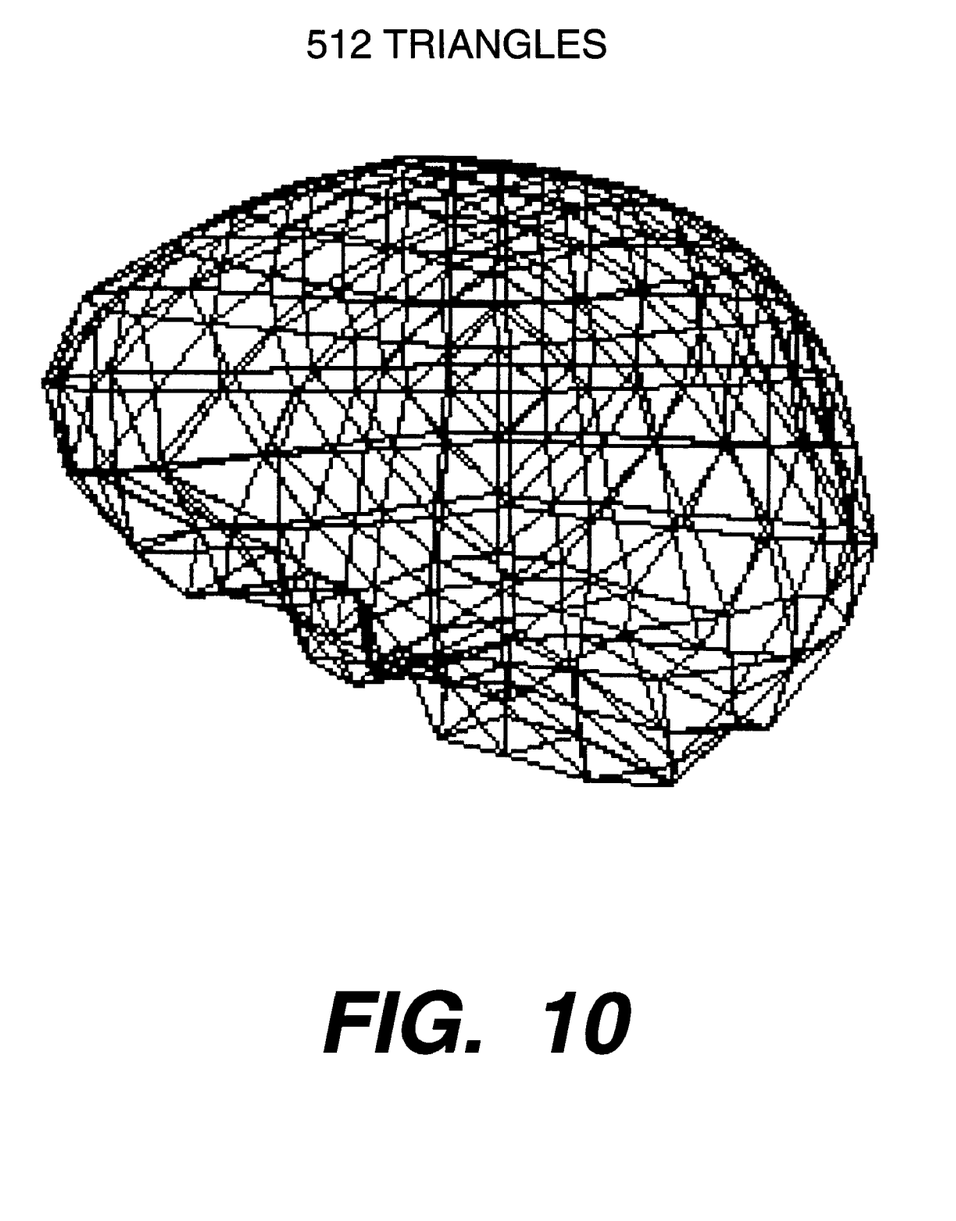
FIG. 10 illustrates a brain modeled using the spherical, reduced mesh of FIG. 6.

The spherical reduced mesh shown in FIG. 6 was used to generate the model of a brain shown in FIG. 10. The brain model includes 512 triangles and is easier to mathematically process than more complex polygonal models.

Figure 11:
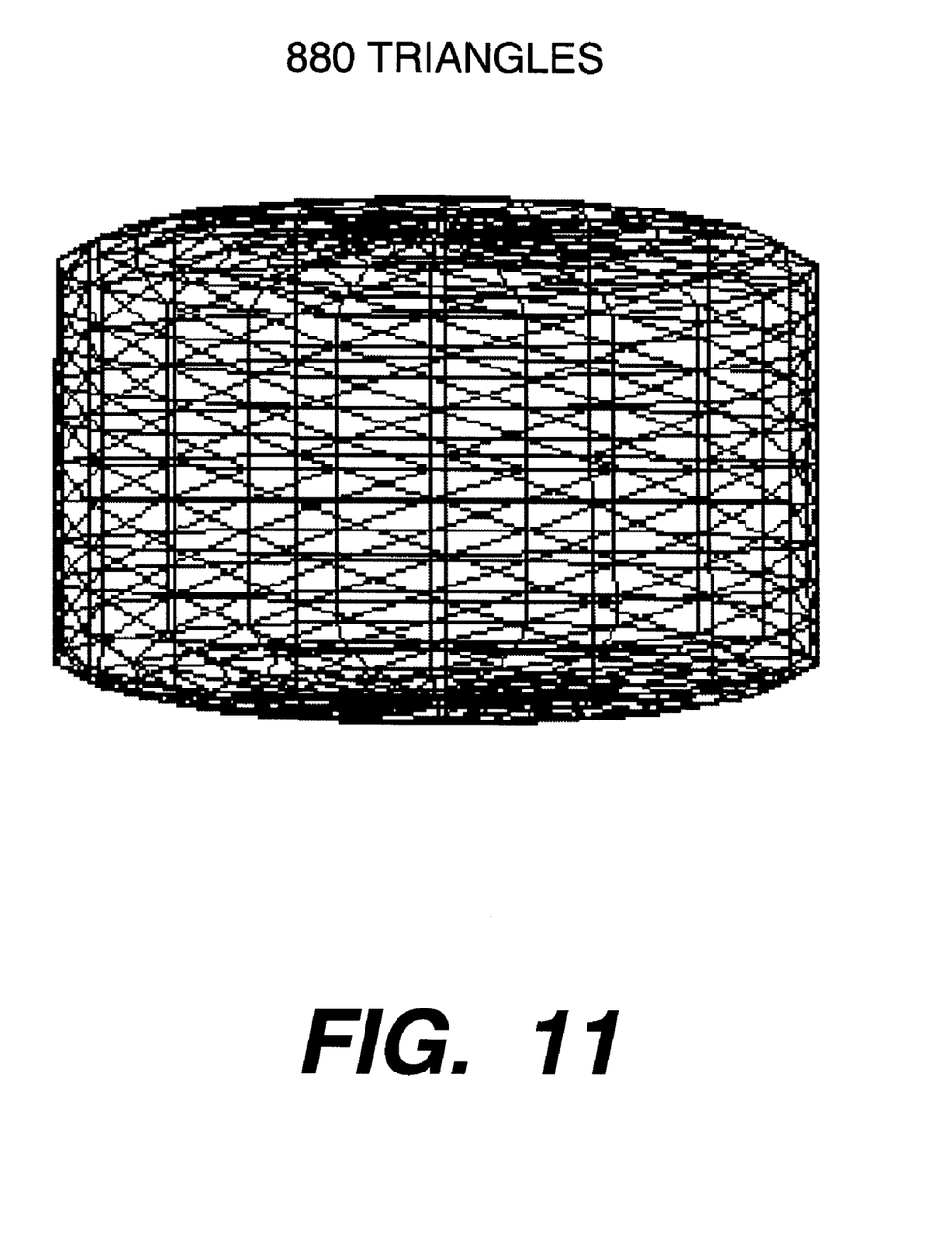
FIG. 11 illustrates a cylindrical, reduced mesh used in an exemplary embodiment of the invention.

In a second embodiment of the invention, the reduced mesh is a cylinder with ellipsoidal caps on the top and bottom made up of 880 triangles as shown in FIG. 11. The central axis of the cylinder establishes the y axis. The cylindrical, reduced mesh is selected for modeling the torso shown in FIG. 1. The process for projecting the cylindrical, reduced mesh to the surface of a complex model is provided below. In the algorithm, the following notations are used.

Profile—an array of points in the (x, y) plane defining a curve which is revolved around the y-axis to create a surface of revolution. An exemplary profile array (for the top half of the surface shown in FIG. 11) is provided below.

Profile []={
  1,0,0,
  1,0.2,0,
  1,0.4,0,
  1,0.6,0,
  1,0.8,0,
  1,1.0,0.
  0.9,1.1089,0,
  0.8,1.1500,0,
  0.6,1.2151,0,
  0.4,1.2291,0,
  0.2,1.2449,0,
  0,1.25,0 }

SET_RAY(angle, j, ray)
  Computation that takes an angle in the x,z plane and a profile index j and stores a ray origin point (0,Profile[j].y, 0) and a ray direction (cos(angle),0, sin(angle)).

SET_INDEX(i)
  Computation that takes angle and profile index j and calculates a corresponding index value i for points in the mesh.

SET_INTERSECTION(ray,intersection)
  Computation that stores in the variable intersection the distance from the ray origin to the intersection point of the ray and the approximated surface. Zero is stored if there is no intersection found.

GET_INTERSECTION(APoint)
  Computation that stores in APoint the coordinates of the intersection between the ray and the surface.

d2(APoint)
  Computation that determines the distance from the APoint to the y axis.

Resolution
  An integer used to calculate mesh points on a cylinder in (x,z) plane.

The algorithm used to project the cylindrical, reduced mesh is provided below in C language. The algorithm generates only the top half of the torso mesh presented in FIG. 15 using the top half of the cylindrical, reduced mesh in FIG. 11 and the top part of the surface in FIG. 1. Repeated application of the algorithm to the bottom parts of FIG. 11 and FIG. 1, correspondingly, produces the bottom part of the surface in FIG. 15. A simple merge of the two halves produces the whole surface shown in FIG. 15.

---

CYLINDRICAL PROJECTION ALGORITHM

```
{
    angle_increment = 360 / resolution;
    coeff= 1;
    old_radius=0;
    for (angle=0; angle<=360; angle += angle_increment)
    for (j=0; j<num_points_in_profile; j++) {
        SET_RAY(angle,j,ray);
        SET_INDEX(i);
/*
* To calculate the radius for a point a ray is projected from point
* (0,Points.x,0) in a direction angle. If the ray intersects the surface, then
* radius is set to the distance from the ray starting point to the intersection
* point. Otherwise, a scaled, previous radius is used for the current radius.
*/
        SET_INTERSECTION(ray,intersection);
        radius=old_radius;
        if (intersection)
        GET_INTERSECTION(APoint);
        radius = d2(APoint);
        coeff = Profile[j].x;
        coeff = coeff? coeff : 1;
        Points[i] = APoint;
        old_radius = radius;
}
else    {
        Points[i].x = Profile[j].x*radius*cos(angle)/ coeff;
        Points[i].y = Profile[j].y;
        Points[i].z = Profile[j].z*radius*sin(angle)/ coeff;
}
}
}
}
}
```

---

Figure 12:
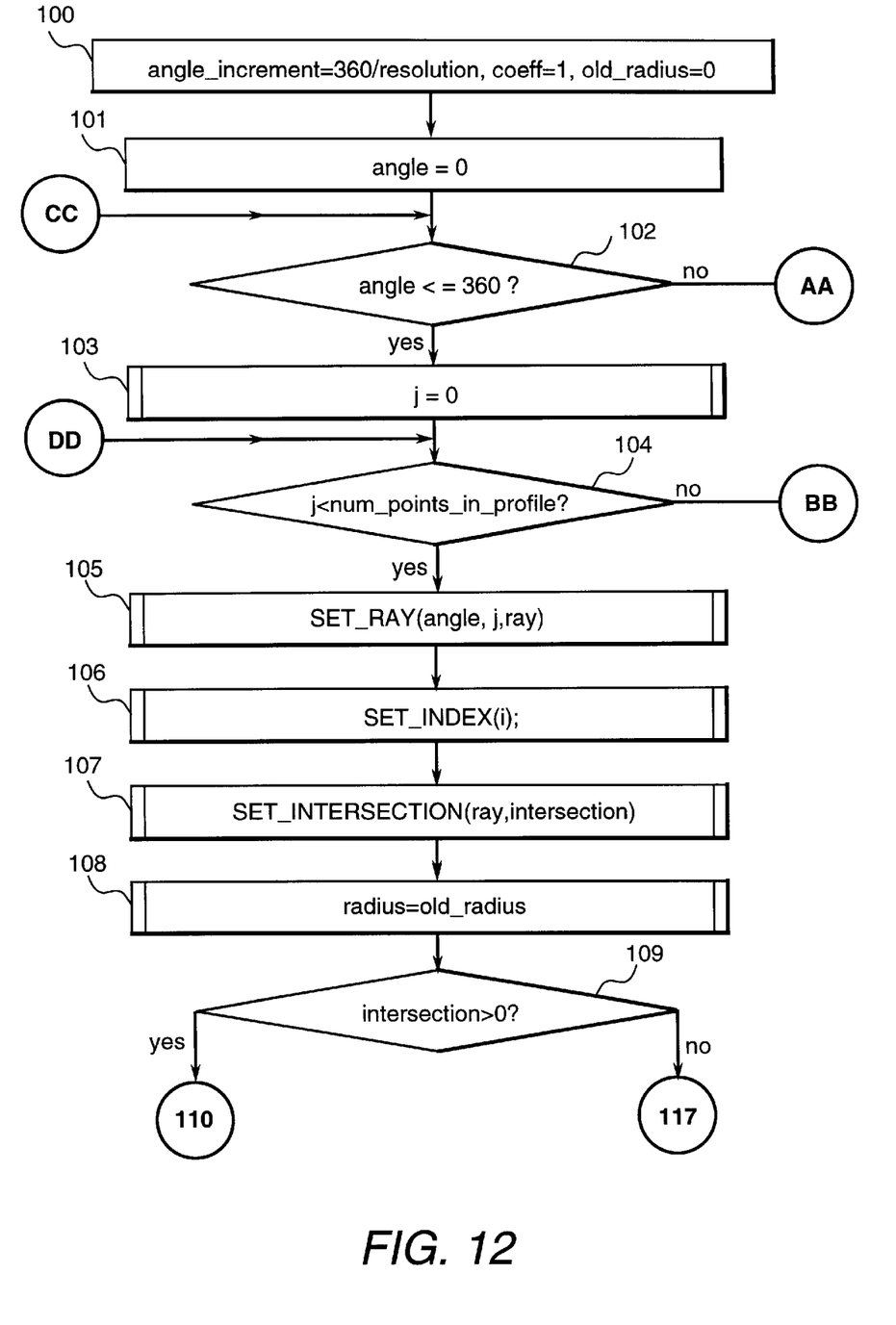
FIGS. 12–13 are a flowchart of the process of projecting the cylindrical, reduced mesh of FIG. 11.
Figure 13:
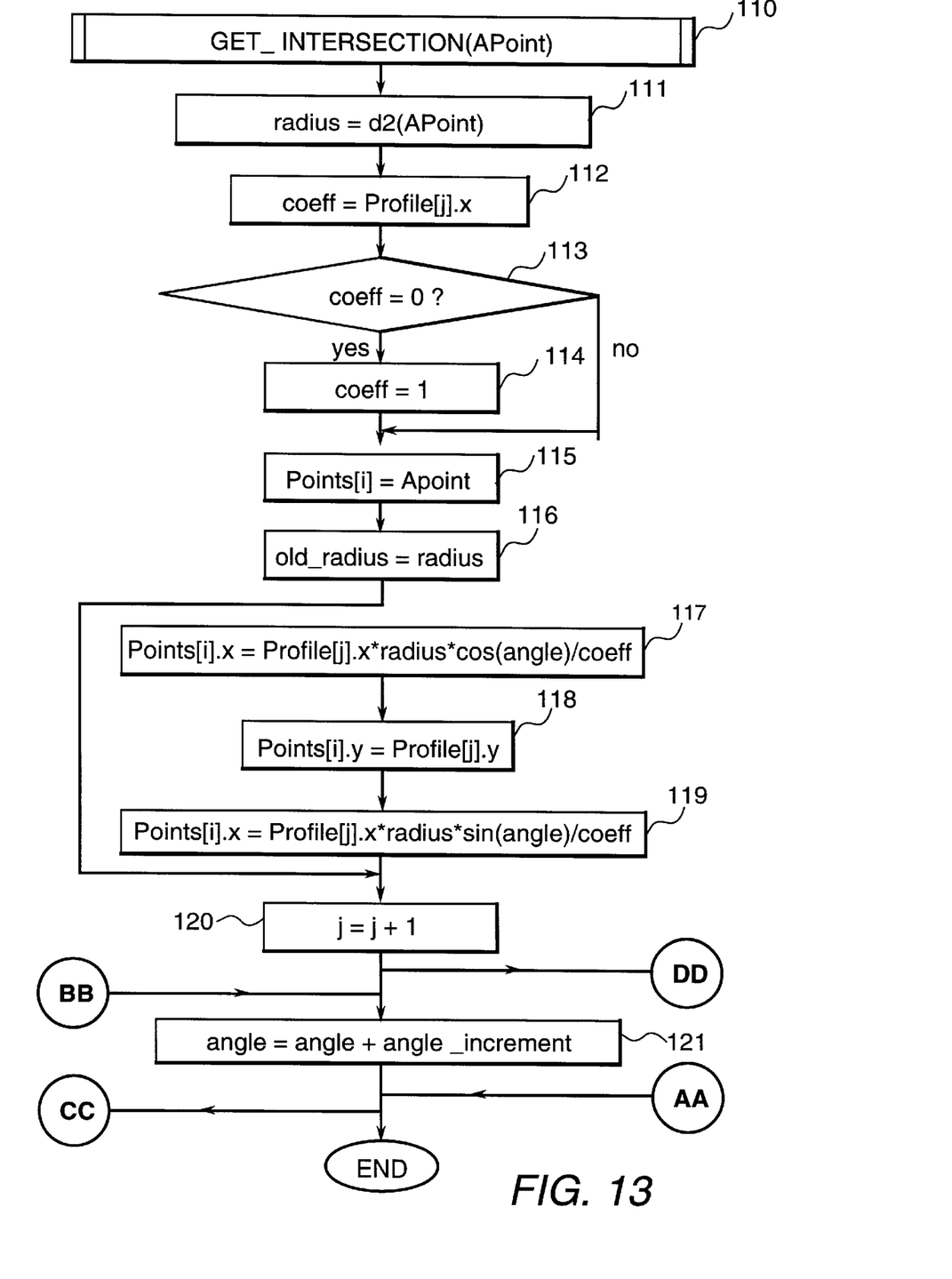
Figure 14:
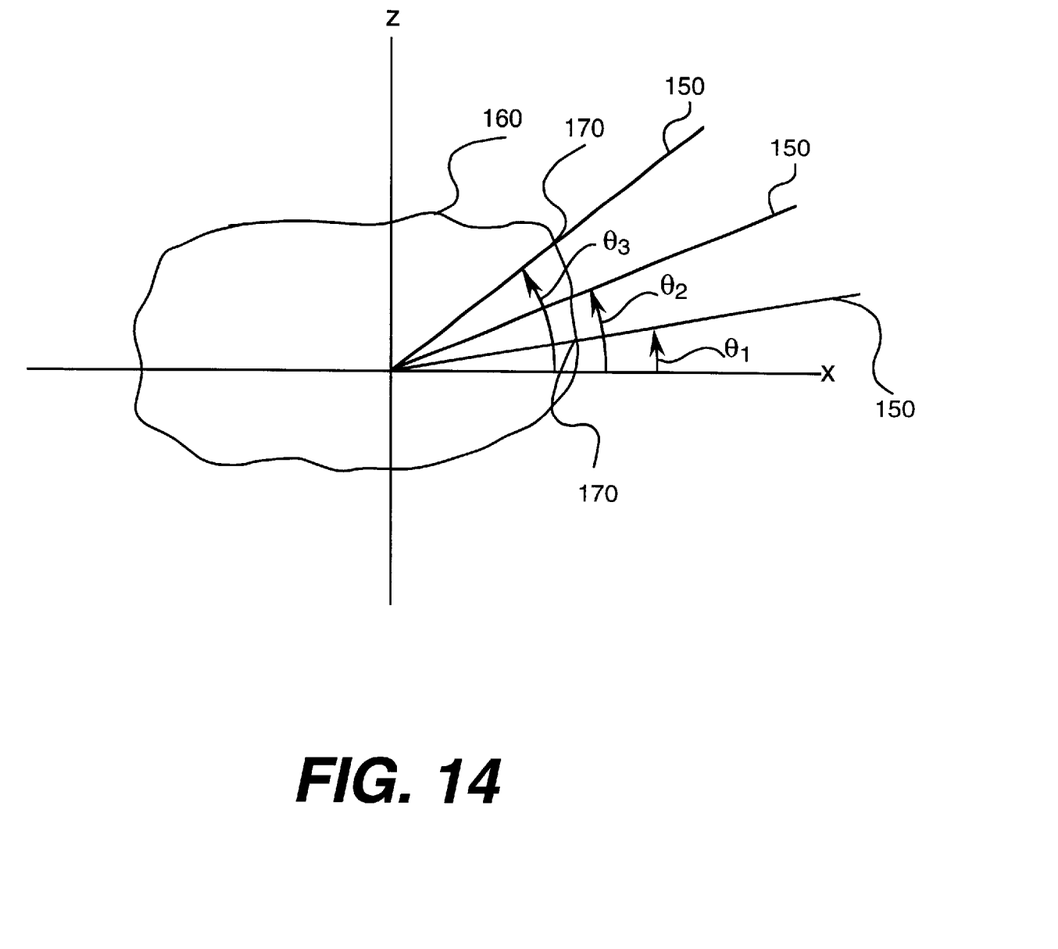
FIG. 14 illustrates a portion of the process of projecting the cylindrical, reduced mesh of FIG. 11.

FIGS. 12 and 13 are a flowchart depicting the cylindrical projection process. As shown in FIG. 14, rays 150 are projected from the y axis at angular increments in an x-z plane towards the surface of the object to be modeled 160. Where the ray 150 interests the object 160 defines an intersection point 170. In a preferred embodiment, a plurality of starting points are used along the y axis of the cylinder. Rays are projected perpendicular to the y axis. If the ray 150 intersects the surface of the object 160, the radius to the intersection point 170 is the projected position of a point-of-interest in the cylindrical, reduced mesh. If the ray 150 does not intersect the surface of the object 160, due to a hole in the surface of the object, then the radius for the current point-of-interest is calculated based on a reference distance such as the previously determined radius. The prior radius can be modified depending upon what point on the profile is being processed.

Referring back to FIG. 12, the process begins at steps 100 and 101 by initializing values to be used in the process. The resolution value establishes the angular increment between rays 150 shown in FIG. 14. At step 102, it is determined if all the rays have been projected and if so, the process ends. Otherwise, the process continues to steps 103 and 104 where it is determined if all the points in the profile have been processed for the current angle. If points remain to be processed, the process goes to steps 105–109. These steps project a ray from a starting point on the y axis at an angular orientation in the x-z plane. At step 109, it is determined if the ray intersects the object. If the ray intersects the object, flow proceeds to steps 110–116 where the point of intersection is stored and the radius to this intersection point is stored as the current radius. Prior to processing the next point, the value of old_radius is set equal to the radius computed for the last point at step 116. The process jumps to step 120 where j is incremented and the process returns to step 103.

At step 109, if the ray does not intersect the object, the process jumps to step 117 where an intersection point is computed based on the radius of the prior intersection point. Steps 117–119 compute the coordinate for the projected point-of-interest by modifying the prior radius based the previous ray. When all the points in the profile have been processed at a first angle, the angle is incremented at step 121 and the process continues until all points in the cylindrical reduced mesh have been processed.

Figure 15:
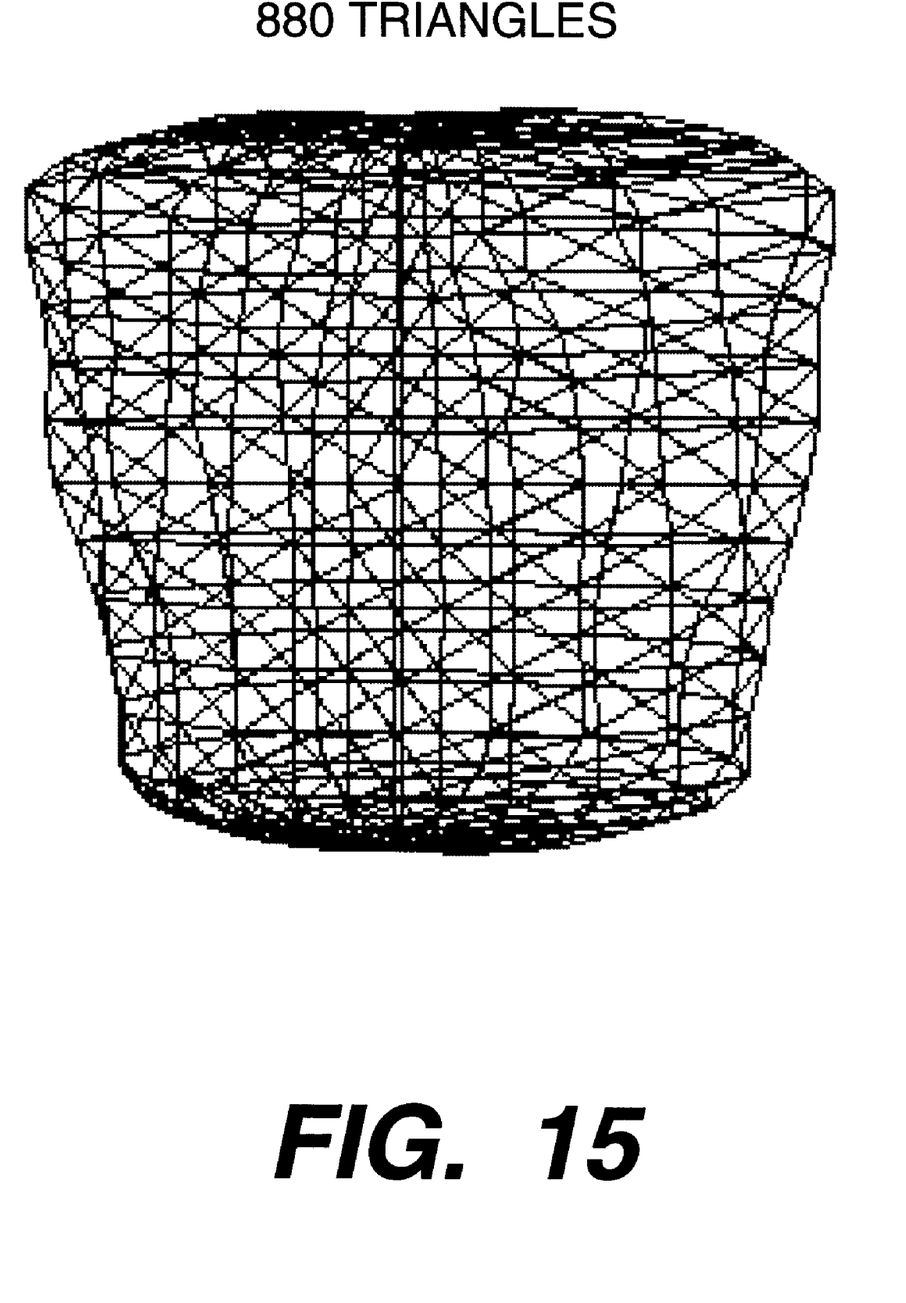
FIG. 15 illustrates a torso modeled using the cylindrical, reduced mesh of FIG. 11.

The cylindrical, reduced mesh shown in FIG. 11 was used to generate the model of a torso shown in FIG. 15. The torso model includes 880 triangles and thus is easier to mathematically process than the more complex models shown in FIG. 1 having 3059 triangles.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for modeling an object comprising:
    obtaining a closed-surface polygonal mesh;
    positioning said closed-surface polygonal mesh relative to said object;
    projecting a ray through a point-of-interest on said closed-surface polygonal mesh;
    determining if an intersection point between said ray and a surface of said object exists;
    adjusting a location of said point-of-interest to a projected position in response to said determining;
    repeating said steps of projecting, determining and adjusting for a plurality of points on said closed-surface polygonal mesh to generate an approximated surface model of the object; and,
    displaying said approximated surface model.

2. The method of claim 1 wherein said closed-surface polygonal mesh is a sphere.

3. The method of claim 1 wherein said closed-surface polygonal mesh is a cylinder.

4. The method of claim 2 wherein said ray is projected from a center of said sphere.

5. The method of claim 3 wherein said ray is projected from starting points along a vertical axis of said cylinder.

6. The method of claim 1 wherein:

said determining includes determining a distance from a starting point of said ray to said intersection point; and said adjusting includes positioning said point-of-interest in response to said distance.

7. The method of claim 6 further comprising:

for said point-of-interest, establishing a reference distance based on at least one previously adjusted point; and wherein said adjusting includes positioning said point-of-interest in response to said reference distance.

8. The method of claim 7 wherein when said ray does not intersect said surface, adjusting said point-of-interest to be positioned said reference distance away from said starting point.

9. The method of claim 8 further comprising:

determining a ratio of said distance to said reference distance;

comparing said ratio to a smoothness value; and setting said distance to said reference distance in response to said comparison.

10. The method of claim 9 wherein:

said reference distance is an average of a distance from said start point to at least two points processed prior to said point-of-interest;

if said ratio is less than said smoothness value, then said point-of-interest is positioned at said reference distance from said starting point; and if said ratio is greater than an inverse of said smoothness value, then said point-of-interest is positioned at said reference distance from said starting point.

11. The method of claim 7 wherein when said ray does not intersect said surface, modifying said reference distance and adjusting said point-of-interest to be said modified reference distance away from said starting point of said ray.

12. The method of claim 1 wherein said point of interest is a vertex of a polygon in said closed-surface polygonal mesh.

13. A storage medium encoded with machine-readable computer program code for modeling an object comprising instructions for causing a computer to implement a method of:

obtaining a closed-surface polygonal mesh;

positioning said closed-surface polygonal mesh relative to said object;

projecting a ray through a point-of-interest on said closed-surface polygonal mesh;

determining if an intersection point between said ray and a surface of said object exists;

adjusting a location of said point-of-interest to a projected position in response to said determining;

repeating said steps of projecting, determining and adjusting for a plurality of points on said closed-surface polygonal mesh to generate an approximated surface model of the object; and, displaying said approximated surface model.

14. The storage medium of claim 13 wherein said closed-surface polygonal mesh is a sphere.

15. The storage medium of claim 13 wherein said closed-surface polygonal mesh is a cylinder.

16. The storage medium of claim 14 wherein said ray is projected from a center of said sphere.

17. The storage medium of claim 15 wherein said ray is projected from starting points along a vertical axis of said cylinder.

18. The storage medium of claim 13 wherein:

said determining includes determining a distance from a starting point of said ray to said intersection point; and said adjusting includes positioning said point-of-interest in response to said distance.

19. The storage medium of claim 18 further comprising instructions for causing a computer to implement a method of:

for said point-of-interest, establishing a reference distance based on at least one previously adjusted point; and wherein said adjusting includes positioning said point-of-interest in response to said reference distance.

20. The storage medium of claim 19 wherein when said ray does not intersect said surface, adjusting said point-of-interest to be positioned said reference distance away from said starting point.

21. The storage medium of claim 20 further comprising instructions for causing a computer to implement a method of:

determining a ratio of said distance to said reference distance;

comparing said ratio to a smoothness value; and setting said distance to said reference distance in response to said comparison.

22. The storage medium of claim 21 wherein:

said reference distance is an average of a distance from said start point to at least two points processed prior to said point-of-interest;

if said ratio is less than said smoothness value, then said point-of-interest is positioned at said reference distance from said starting point; and if said ratio is greater than an inverse of said smoothness value, then said point-of-interest is positioned at said reference distance from said starting point.

23. The storage medium of claim 19 wherein when said ray does not intersect said surface, modifying said reference distance and adjusting said point-of-interest to be said modified reference distance away from said starting point of said ray.

24. The storage medium of claim 13 wherein said point of interest is a vertex of a polygon in said closed-surface polygonal mesh.

* * * * *